United States Patent [19]

Gormley

[11] Patent Number: 5,258,837
[45] Date of Patent: Nov. 2, 1993

[54] MULTIPLE SECURITY VIDEO DISPLAY

[75] Inventor: Austin Gormley, Stillorgan, Ireland

[73] Assignee: Zandar Research Limited, Dublin, Ireland

[21] Appl. No.: 962,775

[22] Filed: Oct. 19, 1992

Related U.S. Application Data

[63] Continuation of Ser. No. 730,111, Jul. 15, 1991, abandoned.

[30] Foreign Application Priority Data

Jan. 7, 1991 [IE] Ireland ................................. 49/91

[51] Int. Cl.⁵ ............................................. H04N 5/445
[52] U.S. Cl. ..................................... 358/140; 358/183
[58] Field of Search ....................... 358/183, 181, 22 P, 358/22, 140

[56] References Cited

U.S. PATENT DOCUMENTS

| | | | |
|---|---|---|---|
| 4,266,242 | 5/1981 | McCoy | 358/22 |
| 4,630,110 | 12/1986 | Cotton | 358/108 |
| 4,650,929 | 2/1985 | Boerger | 358/86 |
| 4,698,664 | 10/1987 | Nichols | 358/10 |
| 4,725,888 | 2/1988 | Hakamada | 358/183 |
| 4,965,819 | 10/1990 | Kannes | 379/53 |
| 4,991,012 | 2/1991 | Yoshino | 358/183 |
| 5,040,067 | 8/1991 | Yamazaki | 358/183 |

FOREIGN PATENT DOCUMENTS

| | | | |
|---|---|---|---|
| 62-108692 | 5/1987 | Japan . | |
| 63-146671 | 6/1988 | Japan . | |
| 63-179671 | 7/1988 | Japan . | |
| 1017580 | 1/1989 | Japan . | |
| 1-221067 | 9/1989 | Japan | 358/22 |
| 1-264381 | 10/1989 | Japan . | |
| 2222343 | 2/1990 | United Kingdom . | |

*Primary Examiner*—Mark R. Powell
*Attorney, Agent, or Firm*—Ladas & Parry

[57] ABSTRACT

Monitoring apparatus for a security system comprises a monitor 21 and twelve video cameras C1 to C12. An effects unit 20 includes a buffer memory 24 and a set of 13 video compression units 23. Twelve of these units generate twelve zones of small size for displaying small complete images on the monitor from the video camera outputs, and the 13th generates a central zone of larger size. Selection means 25 select any desired one of the camera outputs for display as the large image.

16 Claims, 2 Drawing Sheets

MULTIPLE SECURITY VIDEO DISPLAY

This is a continuation of copening application Ser. No. 07/730,111 filed on Jul. 15, 1991, now abandoned.

BACKGROUND OF THE INVENTION

The present invention relates to multiple video monitoring—that is, to the simultaneous monitoring of pictures received from a plurality of video picture sources—and is particularly concerned with such monitoring for security and similar surveillance purposes.

The use of video cameras and their associated video monitoring units has become an indispensable component of modern security and protection services. The number of cameras that might be employed at an institution has steadily increased with time as the expense of surveillance cameras has decreased. In some locations, such as gambling casinos, it is not uncommon for hundreds of cameras and their associated monitors to be in use.

In any such system, a compromise has to be struck between cost and effectiveness. For maximum effectiveness, the picture from each separate camera would be watched by a separate security officer. However, that would normally involve grossly excessive wage costs, particularly in camera-rich and monitor-intensive settings. Each operator (security officer) is therefore assigned a plurality of pictures to watch. Such surveillance imposes a considerable strain on the operator, in that he or she must continually scan a number of individual television monitors equivalent to the number of video sources.

It should be noted that limitations may also be felt as a result of the physical size of the video monitors. Even if no expense were spared in the numbers of operators assigned to view monitors, it rapidly becomes prohibitive to install and maintain a large number of expensive and physically large monitor units in location where operating space is of a high value (such as a gambling casino).

Staying with the example of a gambling casino, the design of the details of such a system involves a choice between a number of further and partially conflicting requirements. With the operator being assigned to observe a set of monitors, the pictures should be large enough to allow the operator a good view of the details of each picture. This is normally achieved by placing the operator within easy view of several large monitors. This achieves the immediate object, but naturally results in the operator being left with one or more of the monitors outside their immediate gaze if their attention should be drawn to an activity on a single monitor.

One apparent solution is to concentrate a number of smaller video monitors closer to the operator. The result is an increase of pictures in the operator's immediate eye scan range, but it is inherent in the nature of small video monitors that it becomes more difficult to carefully observe details, such as an individual's face or subtle actions.

The fundamental difficulty is simply the limitation on the area that might be within the comfortable gaze of a single operator. If there are multiple pictures to be monitored, the operator may fail in their assignment because of having to turn their head in the process of trying to observe several large monitors, or simply fail to notice an action if it occurs on one of several small monitors that are located within their immediate gaze.

A different approach to the problem is to utilize a single monitor on which a substantial number of images from different sources (cameras) are displayed. A typical number of images is 16, in a 4×4 pattern or array. This can be achieved by performing an image reduction process on each source picture, to turn it into an image of reduced size. Each so reduced image is written into a corresponding area in a buffer memory which stores the total of 16 images, and the buffer memory is scanned as a whole to produce the resulting compound picture of 16 images.

However, although the hardware involved in this approach differs fundamentally from the plurality of monitors discussed above, there are considerable functional similarities. Both approaches generate an array of identical pictures or images of equal area.

One major difference is that with a plurality of separate monitors, the pictures are separated by the physical borders of the various monitor screens, while with a single monitor, the images are generally continuous. The other major difference concerns the size of the system. With a single monitor, the images on it will generally be relatively small even though the monitor will generally be chosen to be relatively large, whereas with a plurality of separate monitors, the pictures will generally be relatively large and placed at a considerable distance from the observer even though the individual monitors may be relatively small.

Such systems therefore generally involve the striking of a compromise between having the system as a whole small enough for all the pictures or images to be readily observable by the observer without inconvenience, and having the individual pictures or images large enough for small details to be readily observable.

SUMMARY OF THE INVENTION

The crux of the present invention is the generation, in multiple video monitoring apparatus, of a plurality of complete images of different sizes as a single composite picture on a single monitor, together with selection means for selecting any desired one of the small images for display as a large image. In the preferred arrangement, the monitor screen is notionally divided into 1 large zone for a large image, substantially a linear half of the screen size, in the centre of the screen, and 12 small zones for 12 small images, each substantially a linear quarter of the screen size, arranged around the border of the large zone.

The monitor and the zones into which it is divided will normally all have the same aspect ratio, and this imposes considerable restraints on the sizes and arrangements of the zones on the monitor. As just noted, the preferred arrangement divides the monitor screen into 12 small zones, each making up substantially 1/16th of the screen, and 1 large zone, taking up substantially ¼ of the screen (i.e. 4 times the area of each small zone); and the large zone is preferably also centred in the screen, so that there are 2 small zones contiguous with each of its sides, and 4 more small zones in the corners of the screen. More generally, the screen can be regarded as notionally divided into a square of n×n congruent areas, with one or more m×m squares of these notional areas being merged into each other to form larger squares. The merged blocks are used for large zones, and the remaining areas for the small zones.

Thus the simplest case is the 3×3 one, giving L a division into 5 small zones, each substantially a linear third of the monitor screen, and a single large zone, a linear two-thirds of the screen. This, however, has the disadvantages that the large zone is displayed from the centre of the screen, and the number of small zones is limited to 5.

The next simplest case is the 4×4 one, giving the preferred arrangement of a central large zone substantially a linear half of the screen and surrounded by 12 small zones each substantially a linear quarter of the screen. However, this case permits other arrangements as well. It will usually be preferable to have the large zone located centrally, but it is possible to locate it at an edge or a corner of the screen. This would permit a second large zone to be accommodated on the screen (with the number of small zones then being reduced to 8).

The next case up is the 5×5 one, which allows a considerable number of possible arrangements, such as a central large zone of substantially three-fifths linear size surrounded by 16 small zones, or 4 large zones each of substantially two-fifths linear size separated by 9 small zones arranged in a cross. The same principles obviously apply further up the scale, though if the number of zones becomes too large, a single operator cannot be expected to scan them all effectively.

Obviously, not all the small zones need be fed with live camera video. For example, the preferred screen arrangement might be fed from only 10 cameras, leaving 2 zones blank. Such blank zones are preferably shown in neutral form e.g. as dark grey If there are such blank zones, it may be possible to adjust the positions of the zones with real images. For example, with 2 out of 13 zones blank, the large central zone may have 2 small real zones on each side, and 3 small real zones arranged centrally along its top and bottom. (In effect, this involves splitting the 2 blank zones into halves, and locating the 4 halves one at each end of each of the rows of 3 small real zones.)

The terms "television" and "monitor" have been used indifferently so far. Although there is no fundamental distinction, in practice these two terms are generally taken as describing slightly different kinds of system.

A television system is typified by the public broadcast systems, while a monitor system is often of the type used for data display in computer systems. The relevant distinction for present purposes is as follows. In a television system, the picture size is usually slightly larger than the screen, so that the visible picture extends right up to the frame or casing round the display tube and the edges of the picture are lost. In a monitor system, the picture size is somewhat smaller than the screen, so that the whole of the picture is visible and there is a blank border visible round it on the screen, and the definition of the picture is often better than for a television system.

The present system is preferably implemented using a monitor system. This gives good picture quality, and ensures that the whole of every zone is fully visible. Straightforward implementation of the present system using a television system for the purposes of security and similar surveillance purposes will not generally be acceptable, because of the masking of picture area round the edges of the screen.

This problem can be overcome if necessary by modifying the system so that the zones are slightly smaller than those discussed above. Thus with the "1+12" arrangement, for example, a (linear) reduction ratio of say 0.46 rather than 0.50 for the central zone and of 0.23 rather than 0.25 for the 12 small zones may be sufficient to ensure that the whole of the composite picture is visible on a conventional domestic consumer television screen.

It has been assumed above that the zones are all contiguous. It may however be preferable to separate them slightly, introducing narrow borders between them. This again requires the reduction ratios to be changed slightly, so that the whole of the composite picture can be accommodated on the screen. The dividing border may conveniently be set to dark grey.

It may be desirable for the images to be identified. One way of achieving this is for each camera to have associated with it an identification unit which inserts an identification signal (e.g. an alphanumeric message) into its picture. This results in the message forming an indivisible part of the image, so that the message will be enlarged together with the rest of the image if that image is selected for the large zone.

Another way of achieving this is for the identification signals to be generated in association with the generation of the composite picture. This permits the message to remain the same size regardless of the size of the associated images. If the composite picture has neutral borders between the zones, then the messages can be displayed in those borders.

In a security system, the system will comprise the video monitoring apparatus and will also include a number of video cameras (directed, for example, at regions occupied by patrons and employees of a casino) and providing the pictures to be displayed on the monitor. In general, something suspicious might occur on any of the images, and it will be necessary to allow the security officer to take a closer look at the suspicious picture area. The present system therefore includes selection means for selecting any desired one of the small images for display in the large image area.

The selection means may include a so-called "touch screen" control device attached directly over the video display screen. Such a device allows the operator to select any one of the small images to be enlarged within the large image area at will. This allows the operator to literally point his or her finger or other object at a suspect individual and then see the small image duplicated for detailed examination as the central large image.

The usual mode of operation of the system will generally be a simple select mode, in which there are 12 (at most) video sources each displayed as a corresponding small image, with the selection means operating to permit the duplication of the selected image in the large zone. However, an alternative mode of operation is the swap or shuffle mode, in which the selection of any of the small images for enlargement results in that small image being swapped with the picture currently shown in the large zone The swap mode allows 13 picture sources to be monitored, but has the disadvantage that there is no permanent association between the picture sources and the zones (image positions) on the screen.

In some forms of security system, such as a casino security and monitoring system, the system will also include a video image storage unit (which could for example include a "rogues' gallery" of still images of individuals who are suspected by the casino to be untrustworthy). The video stills storage unit might be accessed by the operator and various faces could be called up from storage and displayed in one of the video zones so that an individual under observation may be matched against a likeness within the stills storage file.

It was noted above that in the 4×4 case and above, there is more than one possible arrangement for dividing the screen between large and small zones. It is possible for the apparatus to be switchable (under operator control) between two (or more) different he situation just mentioned, where there is a "rogues' gallery" of still pictures. The normal screen arrangement will be 1 large zone surrounded by 12 small zones, but when a still picture is to be compared with one of the other pictures, the two pictures (the still and the one which it is being compared with) could both be displayed as large images, side by side. (This would mean, of course, that if there are more than 8 small images, then some of them would be temporarily lost.)

Textual information for display may also be included in the system, either in the video stills storage unit or in a separate text generator unit, which can preferably be accessed as an alternative to the video stills storage unit.

In some gambling establishments, there may be various different rooms with different games ani/or of different sizes, and different rooms may be in use at different times. Obviously the total number of surveillance cameras can be more than 12, as long as not more than 12 are operative at any one time (or 13 if the system is operating in swap mode). The particular selection of cameras operating can of course be changed under operator control at any time. If it is attempted to monitor substantially more than 12 locations by fairly rapid switching of cameras, this will of course be liable to cause operator confusion, though this will be minimized if the pictures are identified, in any of the ways discussed above.

If the establishment consists of two separate buildings or groups of buildings, it may be convenient to provide two control rooms, one in each building, with a single surveillance system having two monitors, one in each control room, both showing the same composite image. For greater security, each control room can have a camera, so that the two control rooms form 2 of the 12 images on the monitor. Each control room can thus monitor the other. Each control room would be provided with a selector device for selecting one of the 12 small images for display as the large central image. At off-peak times, when one or other of the two buildings was closed, the corresponding control room would also be closed down.

It will be realized that the present system bears a superficial resemblance to some known systems, for teleconferencing and the like, using PIP (picture in picture) techniques. Examples of such systems are found in U.S. Pat. Nos. 4,965,819 (Kannes) and 4,650,929 (Boerger et al); the PIP process itself is described in Japanese Patent No. 62-108692. At first sight, these approximate in general appearance to the present system. The video conferencing system of Kannes includes a video display that is illustrated with either five or six active video images seen on a single screen. Likewise, Boerger et al teaches that one, or elements of at least twelve video images can be depicted on a single screen.

However, the technology employed by these known systems leaves them with severe limitations that makes them fundamentally unsuitable for critical monitoring and security applications. In both of these systems, one of the incoming pictures is deemed to be more important than the others. This major picture is fed directly to the monitor screen, to be displayed as a full-sized picture occupying the whole of the screen, and the remaining pictures are inserted inside the large picture by PIP techniques.

The effect of this is that those areas of the large image where the small images have been inserted are effectively lost from view. If several small images are so inserted, the total area of the large image lost from view in this manner is substantial.

In the present context of security and surveillance, the large image will normally have been deliberately selected as the most important one. The loss or effective deletion of areas from the large image which would result from the adoption of PIP techniques, such as those of Kannes or Boerger et al, is unacceptable. In the context of teleconferencing and other uses envisaged by Kannes and Boerger et al, the small images are located in regions of the large image which are less likely to be important, and if something in those regions should be important, the viewer could ask for the view to be changed to bring the obscured Part of the image to a different part of the screen. In the context of security and surveillance, however, that is clearly not an acceptable option.

Further, in the context of security and surveillance the number of images which need to be monitored is likely to be larger than the number of images contemplated by, for example, Kannes. This would increase the fraction of the main image which is lost. This loss of picture content can be reduced by making the small images smaller, but that results in a loss of definition and quality of the small images.

It might be possible to arrange for the locations of the small images to be made variable, so that the operator could move them away from areas of particular interest in the main image, but that would greatly increase the complexity of the system. Further, it would greatly increase the chances of the operator becoming confused, since it would impose additional unnecessary "housekeeping" tasks on the operator in addition to their primary duty of observing the selected image closely for actions which are intended by their committers to be clandestine.

In contrast to these PIP systems, the present system involves the display of the large image with no loss or any part of it (though with a certain reduction in its overall size which is easily compensated for by increasing the size of the viewing monitor).

BRIEF DESCRIPTION OF THE DRAWINGS

Further features of the invention will become apparent from the following description of systems embodying the invention, given by way of example and with reference to the drawings, in which.

DESCRIPTION OF THE EMBODIMENTS

Figure 1:
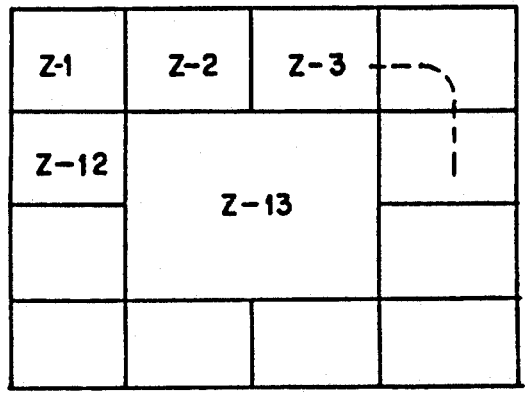
FIG. 1 shows the division of the monitor screen into zones.

FIG. 1 shows the monitor screen display, which has a conventional aspect ratio of 4:3. This is divided into 12 small zones Z-1 to Z-12 and a large zone Z-13, which all have the same aspect ratio as the screen display and which together fill the display area. The small zones are each a quarter of the linear size of the display area, and surround the large zone, which is half the linear size of the display area.

Figure 1A:
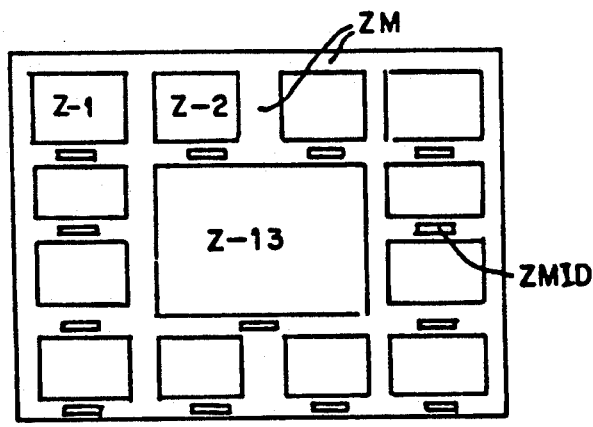
FIG. 1A shows a modification of the FIG. 1 division.

FIG. 1A shows a modified form of the FIG. 1 arrangement, in which zones Z-1 to Z-12 are slightly smaller than a quarter of the display area and zone Z-13 is slightly less than half the size of the display area This leaves narrow marginal areas ZM between the zones.

Figure 2:
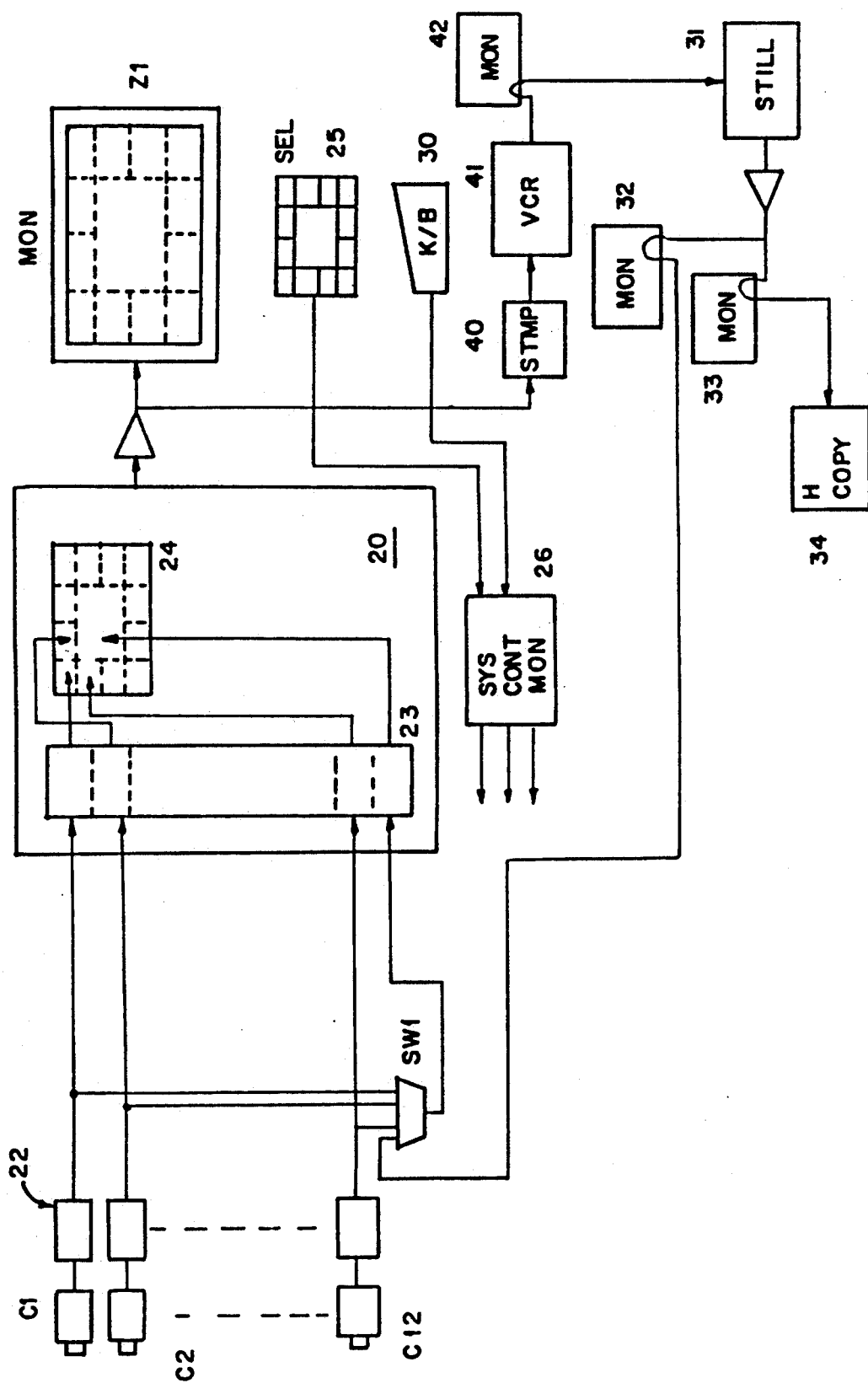
FIG. 2 is a block diagram of a security system.

FIG. 2 shows a simple form of the system. 12 cameras C1 to C12 are directed at locations of interest, and feed 12 input channels of an effects module 20, which in turn feeds the monitor 21 (the screen of which is shown in FIG. 1). A set of 12 video source generators 22 is included in the 12 channels; each of these generators can be set to insert an identification signal (such as a textual message) in the video output from the associated camera This results in the identification signals appearing in the images to which they relate.

The effects module 20 comprises a video compression unit 23 and a read/write buffer 24. Unit 23 comprises 13 sections, corresponding to the 13 input channels to the effects unit. The first 12 sections of unit 23 are identical, and each compresses the incoming signal by a ratio of 16:1 (corresponding to the 4:1 linear size reduction of the small image zones). The final section compresses the incoming signal by a ratio of 4:1 (corresponding to the 2:1 linear size reduction of the large image zone).

(It should be noted that this compression involves condensing each individual picture down by the appropriate amount. This is completely different from what is sometimes termed bandwidth compression, which involves such things as comparing successive pictures and transmitting information about the differences between those pictures.)

The read/write buffer 24 is divided into 13 zones, 12 small and 1 large, corresponding to the 12 small image zones and 1 large image zone of the monitor screen. The outputs of the sections of unit 23 are fed to corresponding ones of the read/write buffer as indicated.

Each zone of the read/write buffer 24 is thus kept filled with the current image received on the corresponding input channel of the effects buffer, while the whole contents of the read/write buffer are fed as a composite signal to the monitor 21, which thus displays the 12 small images and 1 large image in the arrangement shown in FIG. 1.

As so far described, the 12 small image zones display the pictures received from the 12 cameras C1 to C12. The outputs from the cameras C1 to C12 are also fed to a video bridging switcher SW1, shown as a multiplexer, which feeds the 13th input channel of the effects module. A selector device 25, controlled by the operator, has 12 switch areas arranged in a pattern corresponding to the 12 small image zones of the monitor 21. The selector 25 feeds a system control unit 26 which in turn controls the switching unit SW1 to select the camera output corresponding to the selected small image zone. That camera output is therefore selected by the switching unit, and so passed to the 13th channel to the effects module 20 and there processed and so displayed in the central, large image zone Z-13 of the monitor. (It also remains simultaneously displayed in its small image zone.)

In the apparatus just described, the effects unit 20 has been described as including a single read/write buffer 24, with each location of this buffer corresponding to a pixel in the composite image on the monitor 21. These locations are read out in strict sequence line by line down the buffer and point by point along each line. The writing into these locations is more complicated. Essentially, each of the zones (the 12 small zones and the 1 large zone) is written into (by the corresponding section of the compression unit 23) independently of the other zones. If the 12 cameras are operated in synchronism, then all the zones will be written into broadly in parallel.

It will be realized that instead of the single read/write buffer memory 24, the effects unit 20 could contain a set of 12 separate memories, one for each camera. Each would have its locations written into in strict sequence line by line down the buffer and point by point along each line, independently of the other memories; but in this arrangement, the reading from the memories would be more complicated.

The read-out would start by proceeding cyclically through memories 1 to 4, reading along every 4th row in those memories and reading every 4th location along the selected rows. When reading from those memories is finished, the read-out will proceed to memories 12, k, and 5, in cyclic order, reading along every 4th row in memories 12 and 5 and reading every 4th location along the selected rows in those memories and along every 2nd row in memory k and reading every 2nd location along the selected rows in that memory. When reading from memories 12 and 5 is finished, memory k will have been only half read. The read-out will proceed to memories 11, k, and 7, again in cyclic order. Reading will proceed along every 4th row in memories 11 and 6, reading every 4th location along the selected rows in those memories, and will continue along every 2nd row in memory k, reading every 2nd location along the selected rows in that memory. When reading from those memories is finished, the read-out will proceed to memories 10, 9, 8 and 7 in cyclic order, reading along every 4th row in those memories and reading every 4th location in those memories.

In this arrangement, memory k would be one of the memories 1 to 12, selected by the selector 25. Thus whichever one of the memories had been selected would undergo double reading, in two different modes.

Of course, a 13th memory could be used for memory k, so that each memory would only be read once. The output of the appropriate camera would have to be directed to the 13th memory as well as its own memory If the composite picture is of the form shown in FIG. 1A, then identification signals can alternatively be generated in the marginal areas ZMID as shown. If this is done, it is convenient for these signals to be generated in the effects module 20 rather than at the cameras.

The system control unit 26 is preferably located adjacent to the effects unit 20 and switching unit SW1, while the selector 25 and keyboard 30 are located adjacent to the monitor 21.

In addition to the selector device 25, there is a keyboard 30 controlled by the operator and connected to the system control unit 26. A video stills image store 31 has its output connected, via a stills monitor 32, to a further input to the switching unit SW1. By means of the keyboard, a desired still image from the stills unit 31 may be selected and the output from this unit selected by means of the switching unit SW1.

The stills unit 31 also feeds a hard copy device 34 via a hard copy monitor 33. By means of the keyboard 30, a hard copy of the selected still may be printed on the hard copy device, e.g. for later study or as a permanent record.

More elaborate switching means may be provided whereby the output from the stills unit 31 may instead be displayed in that one of the small image zones the contents of which are currently being shown in the large image zone. Such switching may comprise a set of 12 relays, one for each of the camera channels, each relay having one input fed from the corresponding camera and the other input fed from the stills unit, together with suitable control means for operating the relay corresponding to the channel selected for display in the large image zone.

If there are fewer than 12 cameras, of course, then one of the small image zones can be permanently dedicated to such purposes as stills and text display.

The effects module 20 is also coupled to a video recorder 31 via a date and time stamp unit 30. Unit 30 may conveniently be of the type which inserts the date and time information into the vertical interval portion of the video signal (or some other portion of the video signal which is not associated with visible picture information), so that the date and time information does not obscure any part of the visible image (i.e. the 12 small image zones and 1 large image zone). This enables a permanent record to be made of the pictures being monitored.

The video recorder may either be permanently running or operated under control of the operator when an event of interest occurs.

The output of the video recorder is passed, via a monitor 42, to the stills unit 31. This permits an image recorded by the system to be copied into the stills unit for future reference. Similarly, tapes carrying images recorded by other systems can be inserted into the video recorder and so copied into the stills unit.

The hard copy device 34 may be fed from the video recorder 41, as well as or instead of from the stills unit 31.

More elaborate switching is again needed to implement the swap (shuffle) mode of operation. For this, any camera can be associated with any of the small image zones. Switching unit SW1 is still required, to select the picture to be displayed in the large image zone. In addition, a cross-bar type switching unit is required between the camera outputs and the first 12 input channels to the effects unit, to allow any required pattern of connections between the camera outputs and the input channels to the effects unit, appropriately controlled by the system control unit 26.

I claim:

1. Multiple video monitoring apparatus, comprising:
   a plurality n (n being an integer greater than 1) of video cameras producing respective signals;
   selection switching means for selecting k (k being a positive integer less than n) of the camera signals;
   a picture memory;
   a plurality n+k of image compression circuits, the first n of which have the n signals from the cameras coupled directly to them and feed the first n zones of the picture memory and the last k of which have the signals from the selection switching means coupled to them and feed the last k zones of the picture memory; and
   a monitor coupled to the picture memory to display the first n zones of the memory at a common aspect ratio and with a common first size, and the last k zones at the same common aspect ratio as the first n zones and with a common last size larger than the common first size of the first n zones.

2. Apparatus according to claim 1 wherein the monitor has a screen notionally divided into a square of n × n congruent areas, with at lest one m × m square of these notional areas being merged into each other to form a combined area corresponding to a zone of larger size and the remaining areas corresponding to the zones of small size.

3. Apparatus according to claim 2 wherein n=3, with a single block of 2×2 areas being merged to form a zone of larger size.

4. Apparatus according to claim 2 wherein n=4, with a single block of 2×2 areas being merged to form a zone of larger size located centrally on the monitor screen.

5. Apparatus according to claim 2 wherein n=4, with two adjacent blocks of 2×2 areas being merged to form two zones of larger size located centrally side by side on the monitor screen.

6. Apparatus according to claim 2 wherein n=4, and including image processing means operable in two modes in one of which a single block of 2×2 areas is merged to form a zone of larger size located centrally on the monitor screen and in the other of which two adjacent blocks of 2×2 areas are merged to form two zones of larger size located centrally side by side on the monitor screen.

7. Apparatus according to claim 1, wherein the number of cameras is less than the number of small zones, and at least one of the small zones not displaying a camera output is split into two half-zones located symmetrically on opposite sides of the monitor screen.

8. Apparatus according to claim 2 wherein the congruent areas are slightly smaller linearly than one n-th of the monitor screen.

9. Apparatus according to claim 8 wherein the zones are slightly separated from each other.

10. Apparatus according to claim 6, wherein the image processing means including means for generating a plurality of identification messages, one for each zone.

11. Apparatus according to claim 10 wherein the image processing means generates the identification messages outside each zone.

12. Apparatus according to claim 1 wherein the selection switching means include a "touch screen" control device attached directly over the monitor screen.

13. Apparatus according to claim 1 wherein k=1 and wherein the image selected by the selection switching means as a large image remains displayed as a small image.

14. Apparatus according to claim 1 wherein, on the selection of an image in one of the first n zones for display as a larger image in one of the last k zones, the larger image which it displaces is moved to that one of the first n zones.

15. Apparatus according to claim 1 including a video image storage unit the output from which is treated as the output of a camera.

16. Multiple video monitoring apparatus, comprising:
   a plurality n (n being an integer greater than 1) of video cameras producing respective camera signals;
   selection switching means for selecting k (k being a positive integer less than n) of the camera signals;
   a picture memory;
   a plurality n+k of image compression circuits, n first image compression circuits of the image compression circuits being directly coupled to n of the camera signals from the video cameras and feeding the n first zones of the picture memory and k last image compression circuits of the image compression circuits being coupled to k of the camera signals from the selection switching means and feeding the k last zones of the picture memory; and
   a monitor coupled to the picture memory to display the n+k zones thereof, all with the same aspect ratio, the n first zones of the zones being all of one size, and the k last zones of the zones being all of another size that is larger than the size of the n first zones.

* * * * *